(12) United States Patent
Stumpf et al.

(10) Patent No.: US 9,790,981 B2
(45) Date of Patent: Oct. 17, 2017

(54) CONNECTING INSERT AND AN EMBEDDING METHOD AND A PRODUCTION METHOD THEREFOR

(71) Applicant: BÖLLHOFF VERBINDUNGSTECHNIK GMBH, Bielefeld (DE)

(72) Inventors: Michael Stumpf, Bielefeld (DE); Franck Chalvet, St. Badolph (FR); Mohamed-Tahar Rahal, Chambery (FR); Norbert Perroud, Curienne (FR)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 14/915,953

(22) PCT Filed: Sep. 2, 2014

(86) PCT No.: PCT/EP2014/068572
§ 371 (c)(1),
(2) Date: Mar. 2, 2016

(87) PCT Pub. No.: WO2015/028680
PCT Pub. Date: Mar. 5, 2015

(65) Prior Publication Data
US 2016/0195124 A1 Jul. 7, 2016

(30) Foreign Application Priority Data

Sep. 2, 2013 (DE) .................... 10 2013 217 448

(51) Int. Cl.
*F16B 37/04* (2006.01)
*B29C 45/14* (2006.01)
(Continued)

(52) U.S. Cl.
CPC ............ *F16B 37/048* (2013.01); *B29C 45/14* (2013.01); *B29C 65/004* (2013.01);
(Continued)

(58) Field of Classification Search
CPC ...... F16B 37/04; F16B 37/048; F16B 37/065; F16B 37/12; F16B 37/122; F16B 33/02
(Continued)

(56) References Cited

U.S. PATENT DOCUMENTS 3,014,609 A * 12/1961 Hobbs .................... B23P 19/062
174/565
3,125,146 A * 3/1964 Rosan .................... F16B 37/068
411/180

(Continued)

FOREIGN PATENT DOCUMENTS

AT 397843 7/1994
DE 2530882 A1 6/1976
(Continued)

OTHER PUBLICATIONS

Written Opinion & International Search Report for PCT/EP2014/068572 dated Nov. 18, 2014, 9 pages.
(Continued)

*Primary Examiner* — Roberta Delisle
(74) *Attorney, Agent, or Firm* — Reising Ethington P.C.

(57) ABSTRACT

The present disclosure describes a connection insert, in particular a threaded insert, which is embeddable into a formed plastic component. This connection insert comprises a cylindrical main body having a radially outer side, a radially inner side as well as a first and a second axial end, at least one circumferential collar arranged at the radially outer side of the main body which has the largest outer diameter compared to the remaining main body and which is arranged spaced with respect to the first and the second (Continued)

Figure 1:
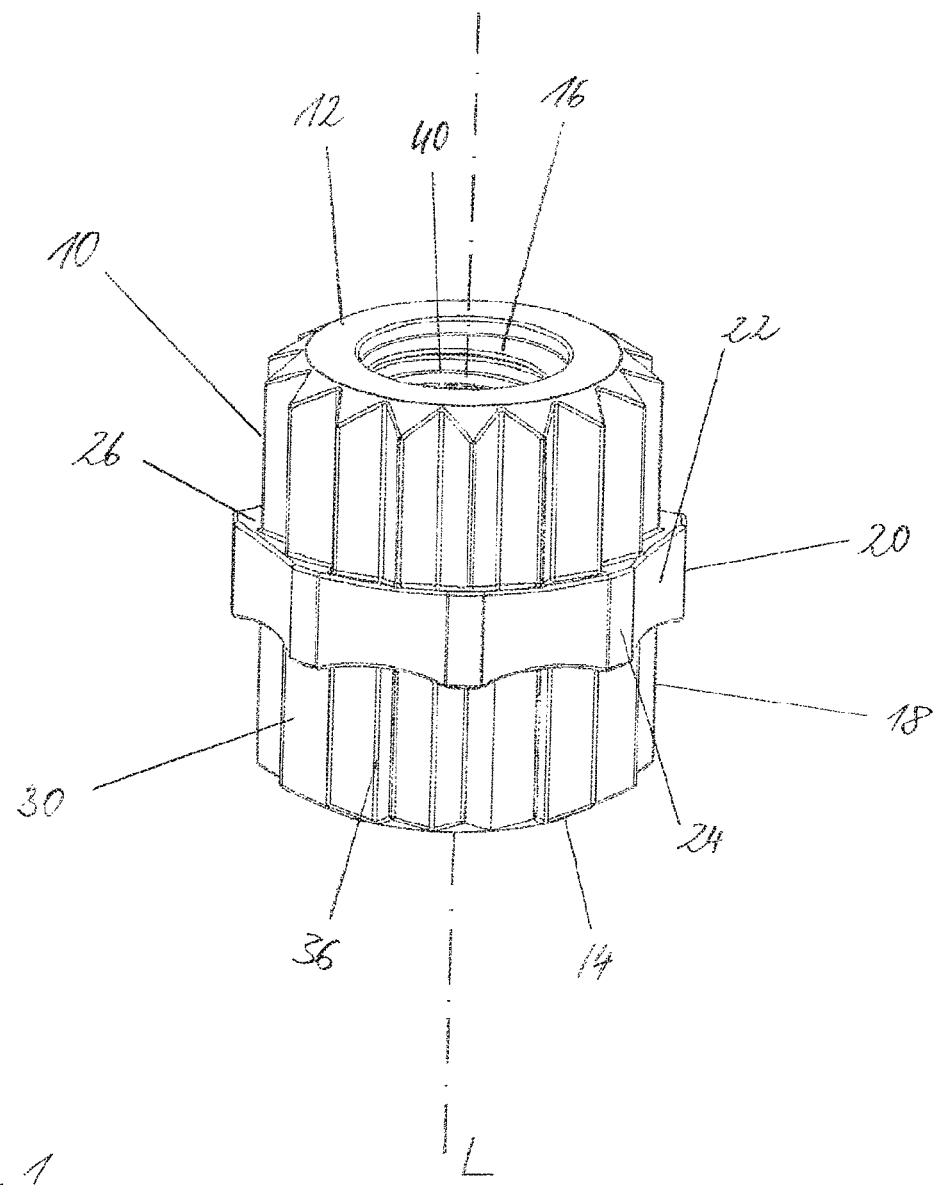

axial end of the main body, and a radially protruding structure arranged at the radially outer side of the main body.

23 Claims, 9 Drawing Sheets

(51) Int. Cl.
  *B29C 65/00* (2006.01)
  *B29K 105/20* (2006.01)
  *B29K 705/00* (2006.01)
  *B29L 31/00* (2006.01)

(52) U.S. Cl.
  CPC .... *B29C 66/30325* (2013.01); *B29K 2105/20* (2013.01); *B29K 2705/00* (2013.01); *B29L 2031/727* (2013.01)

(58) Field of Classification Search
  USPC ........ 411/172, 178, 180, 182–183, 188–189; 29/509
  See application file for complete search history.

(56) References Cited

U.S. PATENT DOCUMENTS

| | | | | |
|---|---|---|---|---|
| 3,198,231 A * | 8/1965 | Bisbing | ................ | F16B 37/122 411/109 |
| 3,204,679 A * | 9/1965 | Walsh | .................. | F16B 37/068 411/180 |
| 3,279,303 A * | 10/1966 | Shackelford | ............ | F16B 19/10 411/49 |
| 3,281,173 A * | 10/1966 | Rosan | .................. | F16B 37/122 403/242 |
| 3,431,960 A * | 3/1969 | Neuschotz | ............ | F16B 37/062 29/432 |
| 3,461,936 A * | 8/1969 | Rosan, Sr. | ............ | F16B 37/068 29/432 |
| 3,467,417 A * | 9/1969 | Whiteside | ............... | F16B 35/06 403/408.1 |
| 3,498,353 A * | 3/1970 | Barry | .................... | F16B 37/122 411/180 |
| 4,729,705 A * | 3/1988 | Higgins | .................... | F16B 5/01 411/174 |
| 4,842,462 A * | 6/1989 | Tildesley | ............. | F16B 37/122 249/59 |
| 4,938,314 A | 7/1990 | Sitzler et al. | | |
| 4,941,788 A * | 7/1990 | Highfield | ............. | F16B 37/122 411/178 |
| 5,366,257 A | 11/1994 | McPherson et al. | | |
| 5,445,483 A * | 8/1995 | Fultz | .................... | B23P 19/062 29/432.2 |
| 5,673,927 A * | 10/1997 | Vermillion | ............. | A63C 5/003 280/14.22 |
| 6,558,096 B2 * | 5/2003 | Kelch | ................... | F16B 35/047 411/180 |
| 6,676,352 B2 | 1/2004 | Chen-Chi et al. | | |
| 7,004,699 B2 * | 2/2006 | Petrok | ....................... | F16B 5/02 411/366.1 |
| 2002/0014714 A1 | 2/2002 | Yoshida et al. | | |
| 2002/0021948 A1 | 2/2002 | Stumpf et al. | | |
| 2010/0175811 A1 * | 7/2010 | Kumai | ................... | B29C 65/44 156/91 |

FOREIGN PATENT DOCUMENTS

| | | |
|---|---|---|
| DE | 2917934 A1 | 11/1980 |
| DE | 3016590 A1 | 11/1981 |
| DE | 3315030 A1 | 10/1984 |
| DE | 3838250 C1 | 1/1990 |
| DE | 10013091 A1 | 9/2001 |
| DE | 10253448 A1 | 6/2004 |
| EP | 0353839 A1 | 2/1990 |
| GB | 1498975 | 1/1978 |
| JP | H08219360 | 8/1996 |
| WO | WO2011109236 A1 | 9/2011 |
| WO | WO2011130070 A1 | 10/2011 |
| WO | WO2011130073 A1 | 10/2011 |

OTHER PUBLICATIONS

English translation of the International Preliminary Report on Patentability for PCT/EP2014/068572 dated Mar. 17, 2016, 8 pages.

* cited by examiner

CONNECTING INSERT AND AN EMBEDDING METHOD AND A PRODUCTION METHOD THEREFOR

1. TECHNICAL FIELD

The present disclosure relates to a connection insert, in particular a threaded insert, which can be molded or embed into a plastic component. Furthermore, the present disclosure relates to an embedding method for this connection insert into the formed plastic component and a molding method for this connection insert into a component to be molded or formed. Further, the disclosure is directed to a manufacturing method for this connection insert and a component with connection insert.

2. BACKGROUND

In the prior art, different connection inserts are known, in particular threaded inserts. Depending on the component materials in which such a component insert shall be fastened, the configuration of the shape of such a connection insert varies. U.S. Pat. No. 6,676,352 B2, for example, discloses a threaded insert, which can be screwed or driven into a pre-drilled hole of a wood component. To this end, this connection insert comprises on its radially outer side thread-like extending ribs that cut into the wood of the component. This connection insert is, thus, constructed similar to a wood screw and, therefore, not suitable for plastic components.

Generally, it is known to embed connection inserts into already formed plastic components. Such an embedding is done by supplying heat to the plastic component so that the plastic is plasticized locally. The connection insert is then pressed into this plasticized plastic so that it is fastened in the plastic component after hardening or curing of the plastic. For such embeddable connection inserts, various constructions are known in the prior art. WO 2011/130070 A1 describes, for example, an embeddable connection insert having a cylindrical main body with a radially outer side. At this radially outer side, circumferentially wavelike extending radially protruding webs are arranged. During the embedding of the connection insert, i.e. while pressing the connection insert in axial direction into the plasticized plastic, these radial protruding webs push plasticized plastic in front of them. As the plasticized plastic cools down during the inserting of the connection insert and has also a poor flow behavior, only a portion of the intermediate spaces between the wavelike extending webs is filled with plasticized plastic. This means that the connection insert has only a low axial security against extraction.

Another connection insert is described in WO 2011/109236 A1. Here, the radially protruding webs arranged at the radially outer side of the cylindrical main body also extend in wave form. In addition, these webs are arranged with an inclination in the axial direction. It follows that with respect to an axial extraction direction, also these webs which approximately extend in axial direction, can only provide a limited extraction strength.

WO 2011/130073 A1 describes an embeddable connection insert having a plurality of protruding locking noses on its radially outer side. These locking noses are formed tapered in axial insert direction of the connection insert for facilitating the embedding. Contrary to the extraction direction, these locking noses comprise supporting surfaces oriented approximately perpendicular to the extraction direction. Compared to the remaining surface of the radially outer side, these supporting surfaces are, however, formed small so that no complete back-flowing of the plasticized plastic can take place due to its high surface tension. Thus, at the same time, the curing plastic does not sufficiently lock the connection insert in the plastic component.

A further connection insert, especially a threaded insert, is described in DE 100 13 091 A1. While a radially circumferential collar is arranged at one end, a plurality of successive conical sections are arranged on the radially outer side of the cylindrical main body. These conical sections taper in the axial insertion direction of the threaded insert. In this way, a plurality of radially circumferential surfaces is formed, which could form an undercut and, thus, a security against extraction. However, as here also only a slow flowing of the plasticized plastic takes place during the embedding, the plasticized plastic flows only incompletely behind the here formed radially circumferential edges. This is partly because the flow channels for the plasticized plastic extending in axial direction cover only small portions of the radially outer side of the main body. A further disadvantage is that an axial security against extraction is provided but the axial strength in insertion direction is given only in a limited way. This is partly because the conically formed radially outer side of the main body supports an axial insertion of the threaded insert into the plastic component.

One object that may be achieved by at least some implementations of the present invention is to provide an embeddable connection insert which is installable with a more reliable security against extraction compared to the prior art.

3. SUMMARY

Advantageous configurations and further developments of the present invention result from the following description, the accompanying drawings, as well as the appending claims.

The inventive connection insert, especially a threaded insert or a connection insert having a threaded bolt, which is moldable into a plastic component comprises the following features: a cylindrical main body having a radially outer side as well as a first and a second axial end, at least one circumferential collar arranged at the radially outer side of the main body which has at least partly the largest outer diameter compared to the remaining main body and which is arranged spaced with respect to the first and the second axial end of the main body, and a radially protruding structure arranged at the radially outer side of the main body.

The inventive connection insert is moldable into a plastic component to be formed or into a formed plastic component so that any connection element or any other component may be fastened in or at this connection insert. According to a further embodiment, the term "molding" defines an embedding process into an already formed plastic component. For this purpose, first, the component material is plasticized in a selected portion in order to embed or to press in the connection insert there. This is explained in more detail below. According to a further embodiment, molding includes the arranging and fastening of the connection insert in a component during its primary shaping process for manufacturing this component. Such primary shaping processes comprise for example casting, die-casting, spray-forming, injection-molding, extrusion blow-molding, extrusion, sintering, electroforming and rapid prototyping. Therefore, the connection insert comprises preferably threaded inserts, inserts for providing a bayonet closure, inserts realizing a snap connection, inserts having a bolt-like axial extension, for example having a thread, and any other connection system by means of which two components can be coupled to each other. Furthermore, the inventive construction, the manufacturing method, as well as the method for embedding and the method for molding of the connection insert into a component is explained based on a threaded insert. Therefore, all constructive and functional features of the threaded insert described in the following apply also to the different connection inserts.

The inventive thread insert achieves due to the special design of its radially outer side reliable axial extract strengths, while at the same time the embedding into a formed plastic component as well as the molding into a plastic or metal component to be formed and, thus, the anchoring of the threaded insert in this component is improved compared to the prior art. The inventive threaded insert comprises on its radially outer side a circumferential collar just not arranged at the two ends of the main body. In this way, this at least one radially protruding collar, which has also the largest outer diameter of the complete threaded insert, creates a high axial strength in both axial load directions of the threaded insert. This is preferably realized only in that the radial circumferential collar forms a locking undercut in the axial extraction direction of the threaded insert as well as in its embedding direction. In combination with this axial stability of the threaded insert, a security against rotation of the threaded insert along its longitudinal axis is realized by means of the radially protruding structure arranged additionally at the radially outer side. In summary, it has to be emphasized that the fastening form-fit between the connection insert and the component or the component material is created especially by means of the raised undercuts of the outer configuration of the connection insert, especially of the cylindrical main body. These raised undercuts are more efficient than the grooves and recesses on the radially outer side of connection inserts known from the prior art.

In order to ensure this security against rotation, it is preferred that the radially protruding structure extends continuously and/or discontinuously in the longitudinal direction of the main body, preferably parallel to the longitudinal axis of the main body. Based on this orientation or course of the protruding structure, radial undercuts are formed which counter-act a rotation of the threaded insert in a blocking manner.

According to a further embodiment, the at least one circumferential collar is limited in axial direction of the main body by two side surfaces, which at least partially enclose each an angle of at most 90° with the longitudinal axis of the main body, especially an angle of less than 90°. Studies have shown that in particular a circumferential collar having two oppositely arranged side surfaces and, thus, side surfaces acting in both directions as undercut support the axial strength of the threaded insert advantageously. It is a further criterion, in which angle the side surfaces are arranged with respect to the longitudinal axis of the threaded insert. Amazingly, especially an angle of 90° and less between the side surface and the longitudinal axis of the main body creates a further increase of the axial strength of the threaded insert within the plastic component. Therefore, and according to different preferred embodiments, different acute angles between the side surfaces of the collar and the longitudinal axis of the main body are used that are configured depending on the load of the threaded insert in the plastic component. Particularly preferred angles, for example, lie in the range between 85° and 70°.

To support the below described embedding method of the threaded insert, the collar of the threaded insert preferably comprises a sectionally changing diameter in a circumferential course, so that a plurality of radial valleys and elevations are arranged in the collar. Amazingly, the circumferential collar does not hinder the embedding of the threaded insert into the plastic component despite its dimensioning as especially the radial valleys ensure that sufficient plasticized plastic may flow over the collar and may, thus, be distributed in the structure on the radially outer side of the main body. This overflowing in the radial valleys also causes that the acute angles between the side surfaces of the collar and the radial outer side of the threaded insert will be filled completely or nearly completely with plastic. After solidification of the previously plasticized plastic, especially the elevations in the circumferential collar cause the already above described axial strength of the threaded insert.

According to another embodiment, the radially protruding structure adjacent to the circumferential collar consists of a knurling extending preferably partly parallel and/or inclined with respect to the longitudinal axis of the main body, which is arranged on one or both sides of the collar. In this context, it is preferred that this structure extends over the complete portion between the axial ends of the main body and the circumferential collar. Similarly, it is preferred that this structure fills only portions or subareas between the axial ends of the main body and the collar. According to a further embodiment, this knurling consists of radially protruding webs evenly spaced with respect to each other that have a polygonal, rounded or curvilinear cross-section.

The structure of the connection insert previously described above is applicable for different connection inserts. Therefore, it is preferred that the connection insert comprises a central bore with the radially inner side at which a connection structure is provided. This connection structure is formed by a thread, a bayonet closure, a radial knurling or another connection construction, which cooperates with an insertable connection element.

According to a further embodiment, the at least one circumferential collar is arranged axially centrally and/or adjacent to the axial ends of the cylindrical main body. At this, the collar is not arranged bordering the axial ends. According to another embodiment, the at least one collar or a plurality of circumferential collars have individually or commonly an axial width of 10% to 60% of a total length of the main body. According to a further embodiment, this axial width comprises 20% to 40% of the total length of the main body. By means of a plurality of circumferential collars, the axial strength of the threaded insert is further increased.

According to a further embodiment of the connection insert, the cylindrical main body comprises at its first axial end a bolt like axial extension. Preferably, this extension is offset from the main body in a stepped manner and/or it comprises preferably a length in the range of 40% to 200% of a length of the main body. Further, it is preferred to form the extension as a connection bolt having an outer thread or a locking contour or a plug connection contour.

The inventively preferred connection insert with axial extension provides a constructive alternative to the threaded insert with inner thread. While the steps required for molding are the same as compared to the threaded insert with inner thread, further connection possibilities are provided. Because already a plugging of a connection element onto the extension or a locking at the extension provides a reliable connection. Moreover, the connection insert with axial extension is effectively manufactured by cold-forming and preferably rolling of the thread on the extension. As a result, a high strength connection insert with threaded bolt is present which is producible inexpensively compared to machining processes.

Further, a component having an embedded or molded connection insert according to the above description may be formed preferably of plastic, which is plasticizable by means of the supply of heat so that the connection insert is embeddable into the already formed component. It is further preferred to provide the component of metal, into which the connection insert can be molded also. According to a further embodiment, the connection insert is also moldable into a plastic component by means of other methods. For this purpose, the connection insert is, for example, positioned in a from designated therefor prior to the forming of the plastic or metal component and is subsequently molded by the plastic or the metal of the component.

The present disclosure comprises further an embedding method for the above described connection insert, which comprises the following steps: plasticizing of material in an embedding portion of a formed plastic component, pressing of the connection insert in axial direction into the embedding portion such that material of the plastic component is dammed up at the collar and at least partially flows over the collar so that the collar forms an axial security against extraction after hardening or curing of the material. As has been explained above, especially the radial valleys and elevations provided at the collar of the connection element cause that during the pressing-in the plasticized material in the radial valleys flows over the collar and is dammed up at the elevations. These flow conditions of the plasticized plastic at the inventively preferred formed collar ensure a filling of almost all or any free spaces on the radially outer side of the main body by plasticized plastic so that the connection insert is fastened optimally in the plastic component after curing of the plastic.

During the embedding method it is also preferred that the plasticized material flows in the axial knurling adjacent to the collar so that thereby a security against rotation of the connection insert is realized after curing of the plastic. Furthermore, the plasticized material of the plastic component flows over an axial side surface on both sides of the collar so that the plasticized material forms an acute-angled undercut as two-sided axial security against extraction after curing.

The present disclosure also discloses a molding method for the above described connection insert. The molding method realizes the fastening of the connection insert in a component while the component is produced of metal or plastic by means of a primary shaping process, for example casting or injection molding. The molding method comprises the following steps: positioning the connection insert in a mold, preferably injection mold, surrounding, preferably over-molding, the connection insert with a plasticized curable material, wherein the connection insert is molded into a component, and curing the surrounding, preferably over-molded, material, and demolding the component with connection insert from the mold. In this context, it is also preferred that the collar of the connection element comprises radial valleys and elevations so that during the over-molding or recasting the plasticized material in the radial valleys flows over the collar and is dammed up at the elevations. Further preferred, the plasticized material flows into an axial knurling adjacent to the collar during the molding method so that thereby a security against rotation is created after curing. According to a further embodiment, the plasticized material at the collar flows over an axial side surface on each side so that the plasticized material forms an acute-angled undercut as two-sided axial security against extraction after curing. From the above description follows that the molding method has similar features and advantages as the embedding method, so that for explaining the molding method, also the description of the embedding method is used. Only the starting point of each fastening method is different.

The present disclosure further comprises a manufacturing method of the above described connection insert. This manufacturing method comprises the following steps: providing a cylindrical main body of metal having a first and a second end, positioning the main body with the first end in or to a first die and with the second end in or to a second die, compressing and/or extruding the first and the second end of the main body so that an at least partially circumferential collar is formed, which has the largest outer diameter compared to the remaining main body and is arranged spaced with respect to the first and the second end of the main body. It is understood that the manufacturing method may be supplemented with further shaping steps to achieve the here inventively preferred connection insert.

The inventively preferred manufacturing method uses an inexpensive cold extruding or cold-forming, as has already been indicated above, to produce the above described inventively preferred constructive features of the connection insert. Due to this, high strength steels having strengths in the range of 8.8 to 10.9 according to DIN EN ISO 898-1 are usable, which achieve especially at an inner thread or a threaded bolt or extension of the connection insert reliable connection properties. When using aluminum as material for the connection insert, the process of cold hardening provides threads that are more robust compared to threads from cutting production. In the same way, it is also possible to use hot pressing or to produce the connection insert by means of casting. For economical reasons, the cold extruding is favored as in this way especially the specifically formed circumferential collar of the connection insert can be formed. For this purpose, preferably a wire piece is sheared off from a continuous wire and positioned as main body in the first and the second die. The first and the second die dictate the future shape of the connection insert in a complementary configuration. Thus, it is preferred according to a specific embodiment of the manufacturing method that after the compressing and/or extruding of the wire piece in the first and the second die, a cylindrical main body having a circumferential collar is present. It is also preferred that already during the compressing and/or extruding, the collar having the above described radial valleys and elevations is formed. According to a further embodiment and in addition to the just described shaping of the collar, also the radially outer side between collar and the end of the main body is provided with the above described structure. According to another preferred manufacturing route, it is also preferred to manufacture the radial structure as well as the shaping of the collar by means of rolling.

For manufacturing a connection insert with axial extension, as it has been described above, a forming of a bolt like axial extension arranged at the first axial end of the main body takes place. According to the desired connection construction, the extension comprises a thread, a locking contour, or a contour for establishing a plug connection.

4. DETAILED DESCRIPTION OF THE DRAWINGS

Figure 2:
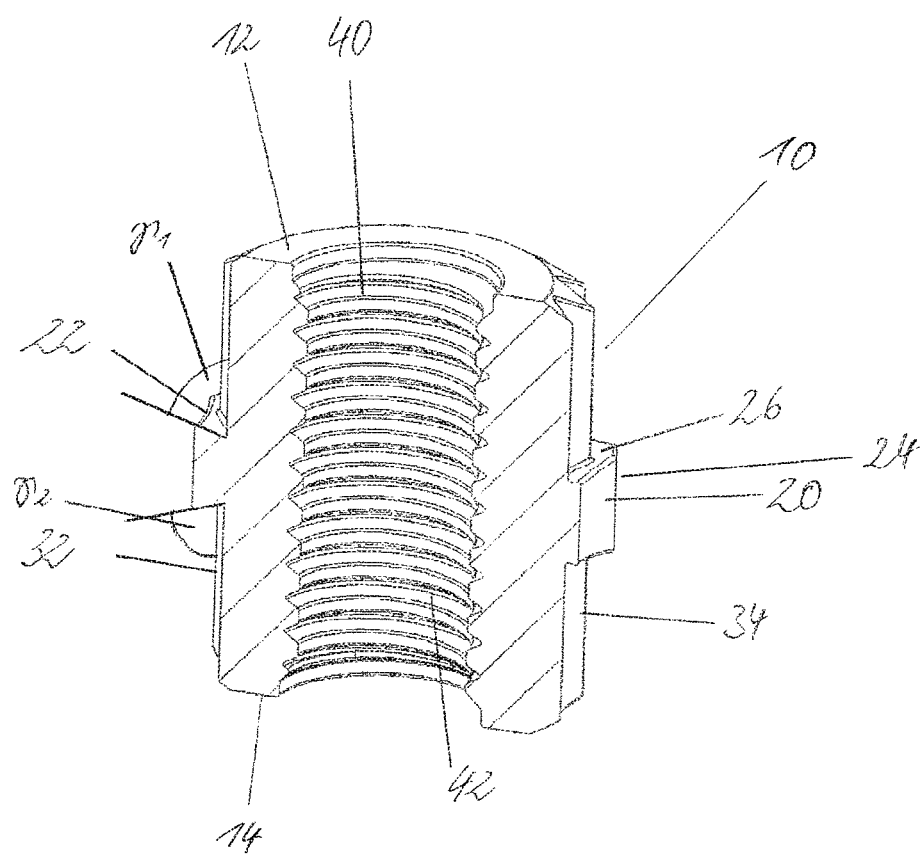
Figure 3:
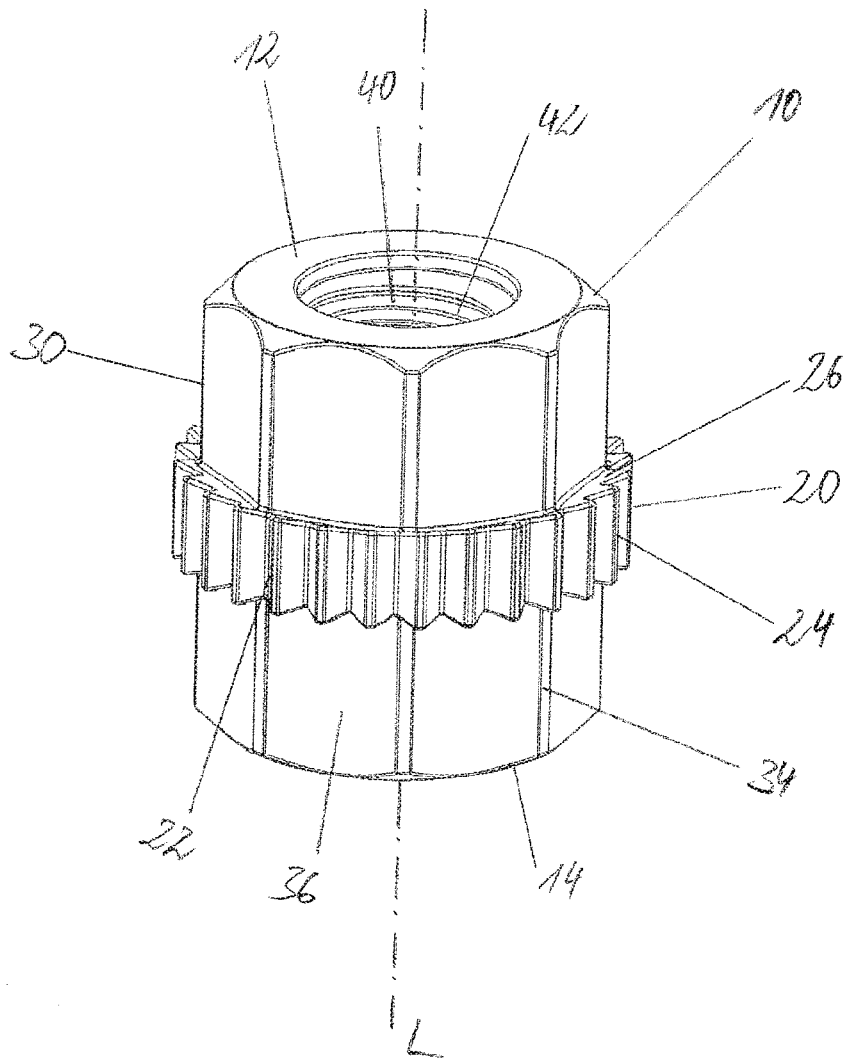
Figure 4:
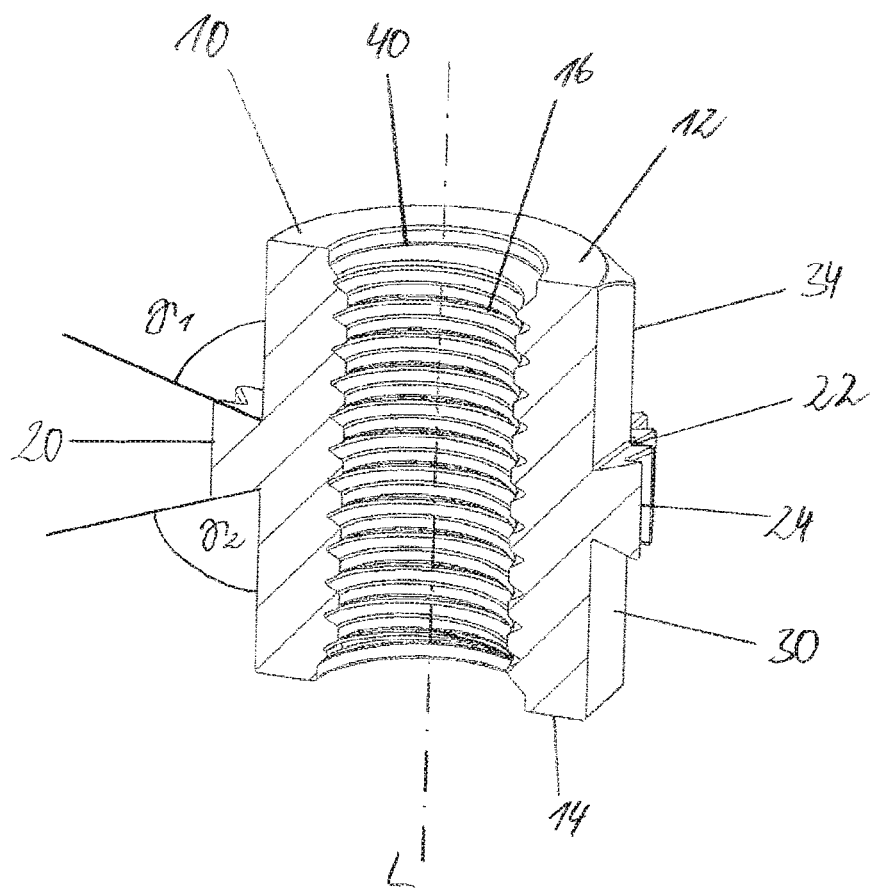
Figure 5:
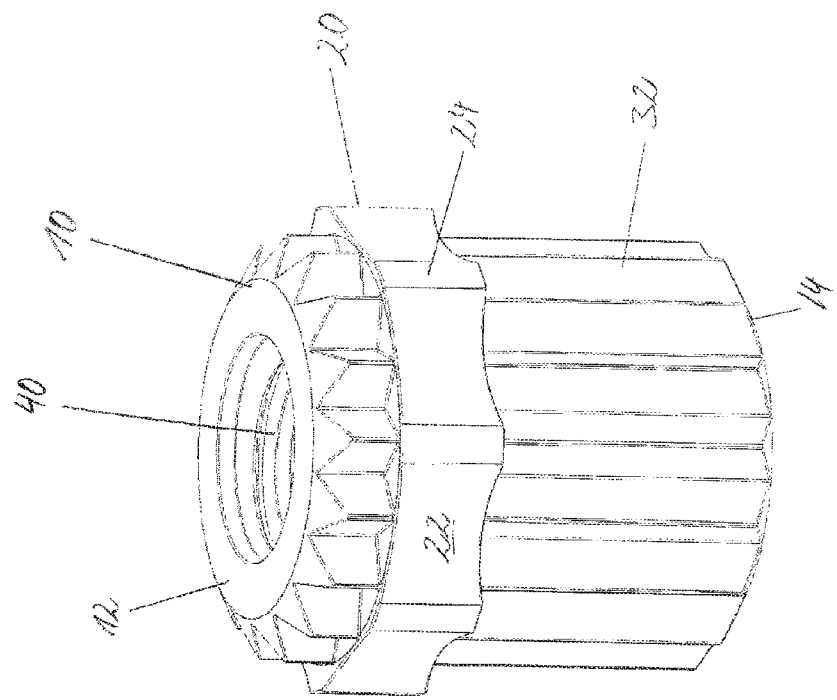
Figure 6:
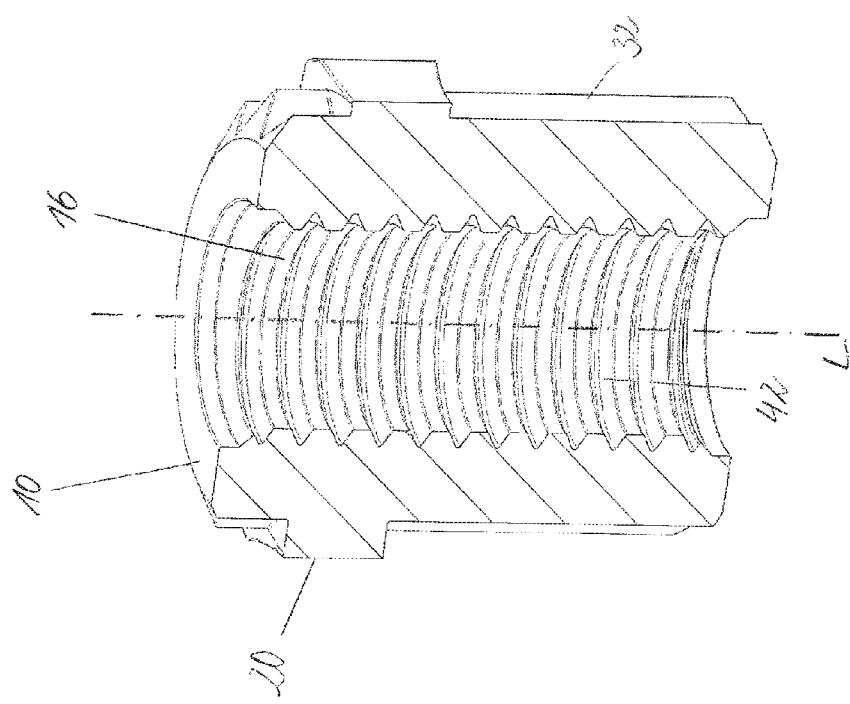
Figure 7:
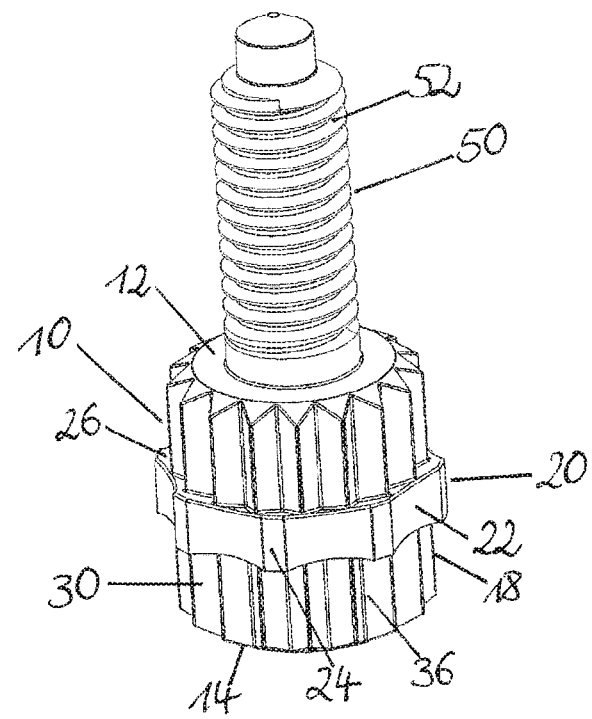
Figure 8:
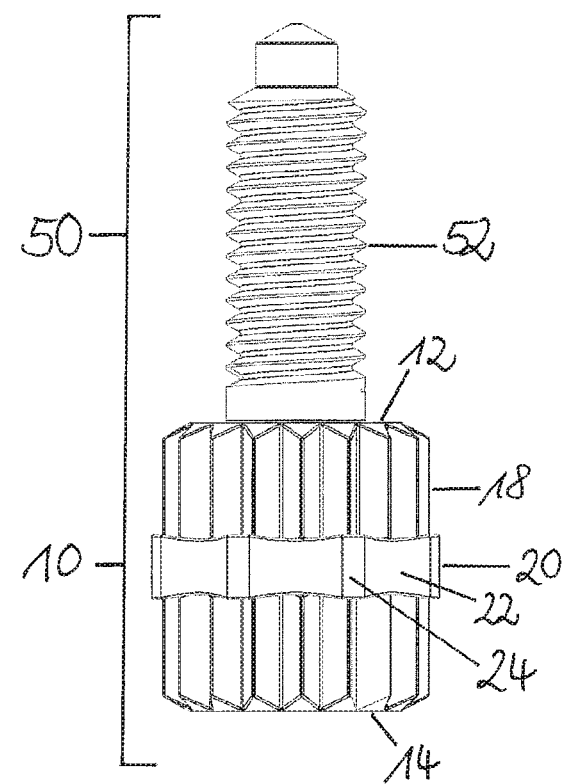
Figure 9:
Figure 10:
Figure 11:
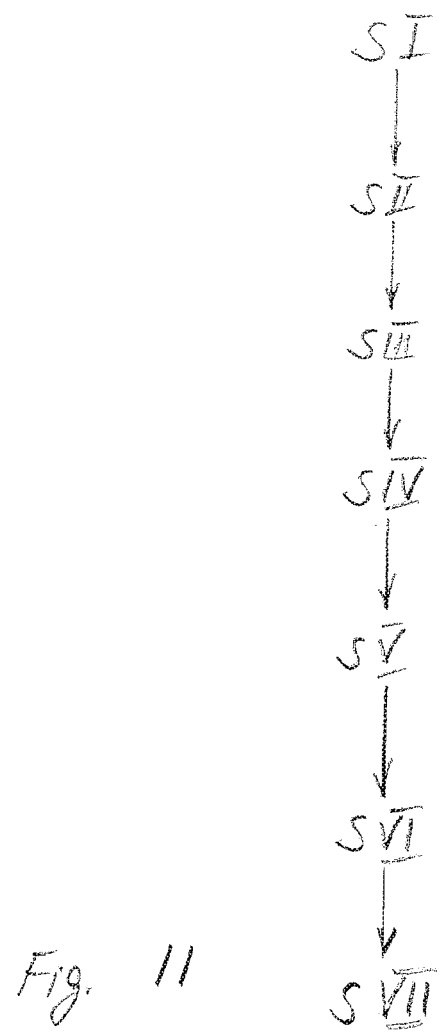

The preferred embodiments of the present disclosure are explained in greater detail with reference to the accompanying drawing. It shows:

FIG. 1 a first embodiment of the connection insert of the present disclosure,

FIG. 2 an axial sectional view of the connection insert according to FIG. 1,

FIG. 3 a second embodiment of the inventive connection insert,

FIG. 4 an axial sectional view through the embodiment according to FIG. 3,

FIG. 5 a third embodiment of the inventive connection insert,

FIG. 6 an axial sectional view of the embodiment according to FIG. 5,

FIG. 7 a third embodiment of the inventive connection insert having an axial extension, FIG. 8 an axial sectional view through the embodiment according to FIG. 7, FIG. 9 a flow chart of an embodiment of the embedding method for the inventively preferred connection insert, FIG. 10 a flow chart of an embodiment of the molding method for the inventively preferred connection insert, and FIG. 11 a flow chart of an embodiment of a manufacturing method of an embodiment of the connection insert.

5. DETAILED DESCRIPTION

In the following, the inventive connection insert is explained based on the embodiment of a threaded insert. FIG. 1 shows a first embodiment of the threaded insert, while in FIG. 2 an axial sectional view of this threaded insert is depicted. The threaded insert comprises a cylindrical main body 10 extending along its longitudinal axis L. This main body 10 comprises a first axial end 12 and a second axial end 14. Since the embodiment is a threaded insert, a central bore 40 is provided in the main body 10. Therefore, a thread is arranged at a radially inner side 16 of the main body 10. Also preferably, the connection insert may be provided with a bayonet closure, a locking mechanism or a locking structure or with another connection construction. According to a further embodiment, the main body comprises instead of a bore having an inner thread an axial extension 50 arranged at the first 12 or second end 14 (see below). As the extension 50 is provided with a connection contour 52, preferably a thread 52, a connection is established by means of the now present threaded bolt instead of the inner thread. The preferred threaded insert and its properties are examples for the structure, the function, the usage as well as the manufacture of inventive connection inserts.

The cylindrical main body is limited in axial direction by means of the first 12 and the second end 14. Along its length, it is preferably equal in diameter, stepped or formed tapered or widened. This applies to a threaded insert with an inner thread 42 as well as to a connection insert having an axial extension 50.

At a radial outer side 18 of the main body 10, at least one radially circumferential collar 20 is arranged. This collar 20 comprises the largest outer diameter compared to the remaining main body 10. Further, the collar 20 is not arranged at the first axial end 12 or at the second axial end 14 of the main body 10. In addition, the collar 20 is present in a rather central arrangement with respect to the length of the main body 10. According to an embodiment shown in FIGS. 5 and 6, the collar 20 is arranged eccentrically with respect to the length of the main body 10. At the same time, the collar 20 is, however, spaced from the first axial end 12 and the second axial end 14 so that the collar 20 does not form the axial end of the main body 10.

According to a further embodiment (not shown), a plurality of collars 20 are arranged at the radial outer side 18 of the main body 10. While only one collar preferably has an axial width of 10% to 60% of a total length of the main body 10, the same applies for the added axial width of a plurality of collars arranged at the radially outer side 18. Preferably, the width of one collar 20 or of a plurality of imagined collars arranged next to each other extends over 20% to 40% of the total length of the main body 10.

Further, the main body 10 comprises at its radial outer side 18 a radially protruding structure 30. This structure 30 extends preferably in axial direction of the main body 10. According to the embodiment of FIGS. 1 to 6, the structure 30 extends over the complete portion between the collar 20 and the first axial end 12 and/or the second axial end 14 of the main body 10. It is also preferred that the structure 30 extends only in subareas between the collar 20 and the first 12 and/or second axial end 14. According to a further embodiment, the structure 30 extends continuously into the above described portions, as can be seen based on FIGS. 1 to 6. It is further preferred that the structure between the collar 20 and the first 12 and/or second axial end 14 is interrupted. It follows that the preferred webs 34 and recesses 36 extending in axial direction extend continuously or interrupted or discontinuously between the collar 20 and the first 12 and/or the second axial end 14.

According to the embodiment shown in FIGS. 1 to 6, a circumferentially arranged knurling 32 is provided as structure 30. This knurling 32 consists of alternating webs 34 and recesses 36, wherein the webs 34 and the recesses 36 preferably have a polygonal, rounded or curvilinear cross-sectional shape (not shown). FIGS. 1 and 2 show a preferred toothed knurling 32, while in FIG. 3 a torx-shaped knurling is provided as structure 30.

As soon as the threaded insert is embedded into a plastic component, plastic flows into the recesses 36 and hardens or cures there. In this way, the hardened or cured plastic forms in the recesses 36 an axial undercut, which blocks a rotating of the threaded insert around its longitudinal axis L. The structure of the collar 20 of valleys 22 and elevations 24 acts also in the same way, which is explained in detail below.

According to FIGS. 1 and 2, the collar 20 comprises an alternating arrangement of valleys 22 and elevations 24 with respect to its radial extension. Especially the elevations 24 form after the molding or pressing-in of the threaded insert into a plastic component a security against extraction in axial direction of the main body 10. This security against extraction acts in both axial directions so that the threaded insert is secured against tension and compression load in the axial direction. The collar 20 in general and the elevations 24 in particular form, thus, an axial undercut, the effect of which is further supported by the formation of the axial side surfaces 26 of the collar 20.

Preferably, the side surfaces 26 enclose with the longitudinal axis L of the main body 10 an angle of at most 90°. According to a further preferred embodiment, this angle is less than 90°. For explanation reasons, this angle is shown in FIGS. 2 and 4 as $\gamma_1$ and $\gamma_2$. $\gamma_1$ denotes the angle between the side surface 26 facing the first axial end 12 and the longitudinal axis L of the main body 10. $\gamma_2$ denotes the angle between the side surface 26 facing the second axial end 14 and the longitudinal axis L of the main body 10. $\gamma_1$ and $\gamma_2$ may be equal or different. According to different embodiments, the angles have a size of $90°<\gamma_1, \gamma_2<65°$, further preferred $80°\leq\gamma_1, \gamma_2\leq70°$. In the embodiments of FIGS. 2 and 4, the angles $\gamma_1$ and $\gamma_2$ are equal and formed acute-angled.

As can be seen based on the different configurations of the collar 20 in FIGS. 1 to 6, the elevations 24 and the valleys 22 are formed differently. Preferably, they are formed saw tooth-like according to FIG. 3 or flattened and concave according to FIG. 1 or generally in the radial cross-section polygonal, rounded or curvilinear. While the shaping of the collar 20 with the elevations 24 and the valleys 22 may be different, the functionality of the collar formed with a varying diameter has to be ensured. Because during the embedding according to step S1 (see below), the elevations 24 cause a damming up of plasticized plastic at the collar 20 against the embedding direction. This damming up provides sufficient plasticized plastic, which fills the structure 30 as well as the space between the side surface 26 and the radially outer side 18 of the main body 10 in the angle range $\gamma_2$.

At the same time, preferably the valleys 22 provide a sufficient overflowing of the dammed up plastic over the collar 20. This overflowing plastic is used to fill the structure 30 at the other side of the collar 20 as well as the angular portion between the side surface 26 and the radially outer side 18 of the main body 10 in the angular portion $\gamma_1$.

Since the structure 30 extends preferably in axial direction of the main body 10, a flowing of plastic into the recesses 26 is supported thereby.

A further embodiment of the connection insert is shown in FIGS. 7 and 8. The connection insert comprises also the cylindrical main boy 10 having the first 12 and the second axial end 14. This main body 10 has the same features in its outer configuration as have been described above generally and/or with respect to the embodiments of FIGS. 1 to 6.

In contrast to the threaded insert, the connection insert according to FIGS. 7 and 8 comprises at its first axial end 12 a bolt like axial extension 50. Preferably, the extension 50 has a smaller diameter as the main body 10 and the collar 20. It is also preferred to provide the diameter of the extension 50 equal to or larger as the outer diameter of the main body 10 and/or the collar 20. Thus, the main body 10 is stepped at its axial end 12 into the extension 50, wherein alternatively also a continuous transition may be realized. It is further preferred that the extension 50 has a cylindrical, a conical, a shape being stepped over its length or any other formed shape (not shown).

According to FIGS. 7 and 8, the connection insert is formed integral with the extension 50. It is also preferred that the connection insert is formed in two parts in that the axial extension 50 is fastened in an inner opening of the connection insert, preferably screwed-in, glued-in, shrunk or otherwise fastened therein. According to a further embodiment, the connection insert with extension 40 comprises an axial through-bore for realizing, for example by means of the connection insert, a fluid connection at a component.

At its radially outer side, the extension 50 comprises preferably a thread 52. According to other embodiments, at this location also other connection contours or constructions are realizable, for example preferably a locking contour, a plug-in contour or a wedging contour. In this context, it should be emphasized that the extension 50 is adaptable in its axial length to specific connection requirements, wherein the axial length is measured beginning at the first axial end 12 of the main body 10. Therefore, the extension 50 has preferably a length in the range of 40% to 200%, preferably 60% to 120% of a length of the main body 10.

The inventively preferred embedding method of the threaded insert can be described as follows based on the flow chart of FIG. 9. First, in step S1, the material of a pre-formed plastic component is plasticized in a selected embedding portion. The plasticizing is performed by means of supplying heat, inductively or by means of ultrasound based on known methods. As soon as the plastic is sufficiently plasticized, the threaded insert is pressed into the plasticized embedding portion of the plastic component in axial direction (step S2). Preferably, the pressing-in is carried out with the second axial end 14 of the main body 10 in advance.

For avoiding that plasticized plastic is deposited in the bore 40, this bore is blocked, for example by means of a suitable bolt or other suitably shaped structures. In this way, the plasticized plastic only flows around the structures on the radially outer side 18 of the threaded insert.

During the pressing-in (step S2), the plasticized plastic is dammed up at the elevations 24 of the collar 20 (step S4). It follows that during the pressing-in of the threaded insert into the plastic component, the collar 20 moves or pushes plasticized plastic in the region of the elevations 24 in front of it. In the region of the radial valleys 24, an overflowing of the dammed up plasticized plastic occurs in step S3. In this way, the valleys 22 as overflowed regions ensure that sufficient plasticized plastic flows into the structure 30 between collar 20 and the first axial end 12 of the main body. Further, these overflowed regions ensure that sufficient plasticized plastic wets the side surfaces 26 facing the first axial end 12 of the main body 10.

During the pressing-in, the plasticized plastic flows in the structure 30, which is arranged on one side or on both sides of the collar 20 (step S5). This plasticized plastic fills the recesses 36 of the structure 30 nearly completely or completely so that the plastic forms a security against rotation of the threaded insert around its longitudinal axis L after hardening or curing.

As has already been explained above, the damming up of the plasticized plastic at the collar 20 as well as the overflowing of the plasticized dammed up plastic at the collar 20 causes that the side surfaces 26 are wetted with the plasticized plastic on both sides, preferably completely. Due to the angular arrangement of the side surfaces 26 of the collar 20 compared to the radially outer side 18 of the main body 10, the hardened or cured plastic forms at these side surfaces 26 preferably acute-angled undercuts. This acute-angled undercuts represents a position protection of the threaded insert in axial direction. This means that the threaded insert is secured against extraction as well as against a further pushing in into the plastic body.

In analogy to the above described push in method, the connection insert is also fastenable in a component of plastic or metal by means of a molding method. Molding methods comprise so-called primary shaping processes by which of means a component is producible from a plasticized material, as for example plastic or metal. This molding method is exemplarily explained based on the injection molding method.

The inventively preferred molding method is explained with respect to the flow chart of FIG. 10 and based on a preferred injection molding method. First, in step E1, the connection insert is positioned in an injection mold (not shown). Depending on the configuration of the connection insert, the interior of the connection insert is blocked by a pin or the like for avoiding the entering of plastic or of another material. After the connection insert has been rigidly arranged in the injection mold, plasticized plastic is injected into the injection mold and thereby, the connection insert is over-molded in step E2. Generally, plasticized curable material is used, as has been mentioned above already, so that the connection insert is molded into the component. After the injection mold has been filled with plastic sufficiently, the overmolded material hardens in step E7. Finally, the component with connection insert is demolded from the injection mold (E8).

During the filling of the mold with plasticized material, as for example, plastic or metal, either during casting or injection molding, the connection insert is surrounded by the plasticized material in the same way as it has been described in connection with the inventively preferred embedding method. Therefore, the method steps E3 to E6 correspond to the above described method steps S3 to S6 of the embedding method, to which it is referred hereby.

Still referring to the flow chart of FIG. 11, the preferred manufacturing method of the inventively preferred threaded insert can be summarized as follows. In a first step S I, a cylindrical main body of metal is provided. The cylindrical main body consists of a wire piece that has been cut off or sheared off of a continuous wire in step S II. This cylindrical main body has a first and a second end (not shown).

Subsequently, this main body is positioned with the first axial end in a first die and with the second axial end in a second die (S III). Considering the first and the second die in an abutting state, the first and the second die define together an internal cavity defining completely or partly the outer shape of the above described threaded insert. This means that the defined cavity comprises a cylindrical shape having a circumferential recess for forming the above described collar 20. Preferably, the collar 20 is formed in a cavity provided therefore at the interface between the first and the second die. This arrangement of the cavity allows a sufficient demolding of the threaded insert, especially if the collar 20 comprises acute-angled aligned side surfaces 26 with respect to the longitudinal axis L of the threaded insert.

After the main body has been positioned in the first and the second die (step S III), a compressing and/or extruding of the first (step S IV) and of the second end (step S V) of the main body 10 occurs preferably by means of moving of the first and the second die towards each other. Due to these operations, a circumferential collar 20 is formed which comprises the largest outer diameter compared to the remaining main body 10. At the same, the collar 20 is arranged spaced to the first axial end 12 and to the second axial end 14 of the main body 10.

On the one hand, it is inventively preferred that besides the collar also the structure 30 is formed at the radial outer side 18 of the main body during the compressing and/or extruding by means of the movement of the first and the second die. According to another embodiment, in step S VI, however, a rolling or extruding of a radially protruding structure occurs, which is arranged at the radially outer side 18 of the main body 10. This formed structure 30 extends also parallel to the longitudinal axis L of the main body 10.

According to a further embodiment of the manufacturing method, in step S VII, the bolt like axial extension 50 is formed, which abuts the first axial end 12 of the main body 10. Subsequently, one of the above mentioned connection contours 52 may be provided at the extension 50.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. Connection insert, which may be molded or embedded into a plastic component and which comprises the following features before molding or embedding into the plastic component:

a. a cylindrical main body having a radially outer side as well as a first and a second axial end,
   b. at least one circumferential collar arranged at the radially outer side of the main body which has at least partly the largest outer diameter compared to the remaining main body and which is arranged spaced with respect to the first and the second axial end of the main body, and
   c. a radially protruding structure arranged at the radially outer side of the main body,
wherein
   d. the collar comprises a sectionally changing diameter in a circumferential course, so that a plurality of radial valleys and elevations are arranged in the collar, and
wherein
   e. the cylindrical body comprises a central bore with a radially inner side at which a connection structure is provided, or the cylindrical body comprises at the first axial end a bolt like axial extension.

2. Connection insert according to claim 1, the radially protruding structure of which extends continuously and/or discontinuously in longitudinal direction of the main body, preferably parallel and/or inclined to the longitudinal axis of the main body.

3. Connection insert according to claim 2, the radially protruding structure of which consists of a knurling extending parallel to the longitudinal axis of the main body, which is arranged on one or both sides of the collar.

4. Connection insert according to claim 3, the knurling of which consists of radially protruding webs which are evenly spaced with respect to each other and that have a polygonal, rounded or curvilinear cross-section.

5. Connection insert according to claim 1, the collar of which is limited in axial direction of the main body by two side surfaces, which at least partially enclose each an angle of at most 90° with the longitudinal axis of the main body, especially an angle of <90°.

6. Connection insert according to claim 5, the at least one collar of which is arranged axially centrally and/or adjacent to the axial ends.

7. Connection insert according to claim 5, the collar or the plurality of collars of which have commonly an axial width of 10% to 60% of a total length of the main body, preferably 20% to 40%.

8. Connection insert according to claim 1, comprising a thread, a bayonet closure or a radial knurling at a radial inner side of the central bore.

9. Connection insert according to claim 1, the extension of which is offset from the main body in a stepped manner and/or comprises preferably a length in the range of 40% to 200% of a length of the main body.

10. Connection insert according to claim 1, the extension of which is a connection bolt having an outer thread or a locking contour or a plug connection contour.

11. Embedding method for a connection insert according to claim 1, comprising the following steps:

a. plasticizing of material in an embedding portion of a formed plastic component,
   b. pressing in of the connection insert in axial direction into the embedding portion such that material of the plastic component is dammed up at the collar and at least partially flows over the collar so that the collar forms an axial security against extraction after curing of the material.

12. Embedding method according to claim 11, wherein the collar of the connection insert comprises radial valleys and elevations so that during the pressing-in the plasticized material in the radial valleys flows over the collar and is dammed up at the elevations.

13. Embedding method according to claim 11, wherein the plasticized material flows into an axial knurling adjacent to the collar so that thereby a security against rotation is realized after curing.

14. Embedding method according to claim 11, wherein the plasticized material flows over an axial side surface on both sides of the collar so that the plasticized material forms an acute-angled undercut as two-sided axial security against extraction after curing.

15. Molding method for a connection insert according to claim 1, comprising the following steps:
   a. positioning the connection insert in a mold, preferably injection mold,
   b. surrounding, preferably over-molding, the connection insert with a plasticized curable material, wherein the connection insert is molded into a component, and
   c. curing the surrounding, preferably over-molded, material, and demolding the component with connection insert from the mold, preferably injection mold.

16. Molding method according to claim 15, wherein the collar of the connection element comprises radial valleys and elevations so that during the surrounding, preferably over-molding, the plasticized material flows over the collar at the radial valleys and is dammed up at the elevations.

17. Molding method according to claim 15, wherein the plasticized material flows into an axial knurling adjacent to the collar so that thereby a security against rotation is created after curing.

18. Molding method according to claim 15, wherein the plasticized material at the collar flows over an axial side surface at both sides respectively so that the plasticized material forms an acute-angled undercut as two-sided axial security against extraction after curing.

19. Component comprising a connection insert according to claim 1.

20. Manufacturing method of a connection insert comprising the following steps:
   a. providing a cylindrical main body of metal having a first and a second end,
   b. positioning the main body with the first end to a first die and with the second end to a second die,
   c. compressing and/or extruding the first and the second end of the main body so that a circumferential collar is formed, which has the largest outer diameter compared to the remaining main body and which is arranged spaced with respect to the first and the second end of the main body, and a radially protruding structure arranged at the radially outer side of the main body, wherein
   d. the collar comprises a sectionally changing diameter in a circumferential course, so that a plurality of radial valleys and elevations are arranged in the collar, and wherein
   e. the cylindrical body comprises a central bore with a radially inner side at which a connection structure is provided, or the cylindrical body comprises at the first axial end a bolt like extension.

21. Manufacturing method according to claim 20, wherein a wire piece is sheared off from a continuous wire.

22. Manufacturing method according to claim 20, comprising the further step:
   rolling or extruding a radially protruding structure, which is arranged at a radially outer side of the main body and which extends parallel to the longitudinal axis of the main body.

23. Manufacturing method according to claim 20, comprising the further step:
   forming a bolt like axial extension adjacent to the first axial end of the main body.

* * * * *